UNITED STATES PATENT OFFICE.

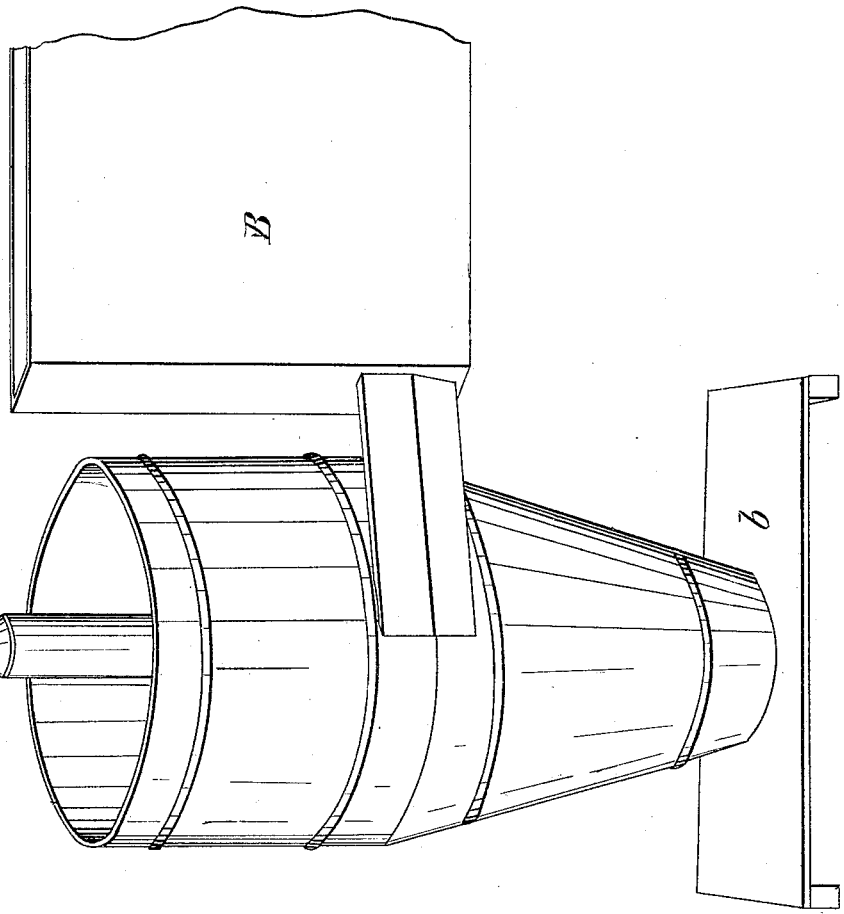
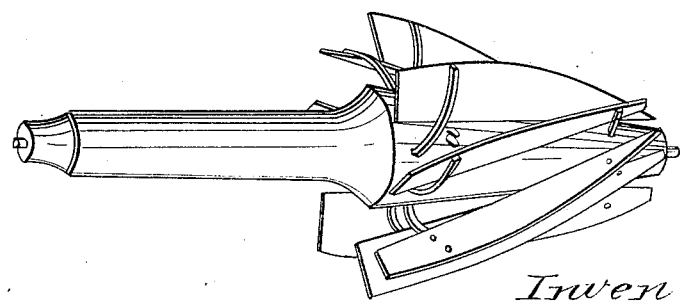

THOMAS N. WHITCOMB AND JOSEPH M. WHITCOMB, OF GRAFTON, VERMONT.

IMPROVEMENT IN WATER-WHEELS.

Specification forming part of Letters Patent No. 1,055, dated December 31, 1838.

*To all whom it may concern:*

Be it known that we, THOMAS N. WHITCOMB and JOSEPH M. WHITCOMB, of Grafton, in the county of Windham and State of Vermont, have invented a new and improved mode of constructing a water-wheel and curb, so as (when water is applied) to produce a whirlpool within the curb for the purpose of driving the wheel, and of which we do hereby declare the following to be a full and exact description, reference being had to the annexed drawings.

The nature of our invention consists of attaching to the common upright shaft long spiral or straight buckets and the form of the inverted conical curb for the same to run in, as hereinafter described. (See drawings, Figure I.) We insert near the bottom of the shaft and in the direction of the center as many short arms of wood or metal as we wish to have buckets in the wheel. Nearly as far up the shaft as we wish to have the buckets extend we insert a like number of long curved arms, (see *a* in Fig. I,) to which we attach the buckets with their lower ends nearly or quite in contact with the lower end of the shaft and their upper ends to the curved arms above, in such a manner as to stand out from the shaft on an angle of forty-five to eighty degrees, (as will best suit the location of the wheel,) and also on a similar angle crossing the perpendicular line of the shaft. (See Fig. 1.)

Fig. II is a representation of the curb made of wood and bound with wood or iron, and of sufficient capacity to contain the wheel in its lower or inverted conical part.

*b* in Fig. II is a platform raised from the bottom of the wheel-pit to support the curb, and that the water after passing through a hole in its center may move off under it.

For the purpose of conveying the water from the flume B to the wheel we insert one or more spouts on or nearly on a line with the inner surface of the curb, thereby giving it a circular motion, which, with the gathering of the water toward the center of the wheel by the position of the buckets and the consequent inclination to a vacuum in front of the buckets, produces a powerful whirlpool.

It is intended that the size and proportions of the wheel and curb and the pitch or curve of the buckets may be varied to suit the place and purpose to which they may be applied.

What we claim as our invention, and desire to secure by Letters Patent, is—

The giving to the curb the form of the frustum of an inverted cone and adapting the buckets thereto, the whole constructed and operating substantially in the manner described.

THOMAS N. WHITCOMB.
JOSEPH M. WHITCOMB.

Witnesses:
HENRY MELLIRT,
WM. WHITCOMB.